United States Patent
Luo et al.

(10) Patent No.: US 9,935,414 B2
(45) Date of Patent: Apr. 3, 2018

(54) COMMUTATOR OF AN ELECTRIC MOTOR

(71) Applicant: JOHNSON ELECTRIC S.A., Murten (CH)

(72) Inventors: Qing Bin Luo, Shenzhen (CN); Chi Wai Lai, Hong Kong (CN); Wen Ming Wu, Shenzhen (CN); Zhao Sen Meng, Shenzhen (CN); Xiao Lin Ren, Shenzhen (CN); Xian Xue Ao, Shenzhen (CN); Bei Bei He, Shenzhen (CN); Hong Jiang Zhao, Shenzhen (CN); Ying Song Ye, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 347 days.

(21) Appl. No.: 14/966,606

(22) Filed: Dec. 11, 2015

(65) Prior Publication Data

US 2016/0172810 A1    Jun. 16, 2016

(30) Foreign Application Priority Data

Dec. 12, 2014    (CN) .......................... 2014 1 0768577

(51) Int. Cl.
| | | |
|---|---|---|
| *H02K 13/04* | (2006.01) | |
| *H01R 39/04* | (2006.01) | |
| *H02K 11/028* | (2016.01) | |
| *H02K 7/00* | (2006.01) | |
| *H02K 11/40* | (2016.01) | |

(52) U.S. Cl.
CPC ............ *H01R 39/04* (2013.01); *H02K 7/003* (2013.01); *H02K 11/028* (2013.01); *H02K 11/40* (2016.01)

(58) Field of Classification Search
CPC .. H02K 11/026; H02K 11/028; H02K 11/024; H02K 13/006; H02K 13/105; H02K 11/02
USPC .............................. 310/231–236, 51
See application file for complete search history.

(56) References Cited

U.S. PATENT DOCUMENTS

| | | | | |
|---|---|---|---|---|
| 5,157,294 A | * | 10/1992 | Matsushita | H02K 7/04 310/40 MM |
| 5,266,860 A | * | 11/1993 | Chiba | H01R 39/46 310/220 |
| 6,975,058 B2 | | 12/2005 | Langguth et al. | |
| 2005/0073214 A1 | * | 4/2005 | Potocnik | H01R 39/04 310/236 |
| 2015/0137658 A1 | * | 5/2015 | Gorlt | H01R 39/04 310/234 |

* cited by examiner

*Primary Examiner* — Thanh Lam
(74) *Attorney, Agent, or Firm* — Muncy, Geissler, Olds & Lowe, P.C.

(57) ABSTRACT

A commutator has a conductive layer, a segment layer and an insulating layer separating the conductive layer and the segment layer. The segment layer includes multiple commutator segments. A mounting hole is defined along an axis of the commutator passing through the conductive layer. The three-layer structure of the commutator forms a capacitor having an increased confronting area and reduced inter-plate distance. The capacitor thus has a greater capacitance and hence greater EMI absorbing capability, making it possible to reduce EMI emissions without additional EMI reduction components outside the commutator. A rotor and a motor employing the commutator are also disclosed.

12 Claims, 8 Drawing Sheets

US 9,935,414 B2

COMMUTATOR OF AN ELECTRIC MOTOR

CROSS REFERENCE TO RELATED APPLICATIONS

This non-provisional patent application claims priority under 35 U.S.C. § 119(a) from Patent Application No. 201410768577.7 filed in The People's Republic of China on Dec. 12, 2014, the entire contents of which are hereby incorporated by reference.

FIELD OF THE INVENTION

The present invention relates to an electric motor, and in particular, to a commutator for an electric motor, especially a micro or sub-fractional horsepower DC motor.

BACKGROUND OF THE INVENTION

As shown in FIG. 5, during operation of a DC commutator motor, sparks may be generated between a commutator and a carbon brush, which may cause electromagnetic interference (EMI). To suppress or eliminate EMI, a typical measure is to dispose a structure made of an EMI-absorbing material in the motor and surrounding the commutator. However, this increases the weight of the motor, which is not desirable. In addition, this EMI-suppressing structure and its associated mounting structure make the motor structure more complicated, which leads to a more complex manufacturing process and higher manufacturing costs.

SUMMARY OF THE INVENTION

Hence there is a desire for a more simple solution for absorbing EMI in a DC commutator motor.

Accordingly, in one aspect thereof, the present invention provides a commutator comprising: a conductive layer, a segment layer including a plurality of commutator segments, and an insulating layer fixed between the conductive layer and the segment layer, the insulating layer electrically isolating the segment layer from the conductive layer, wherein the conductive layer, the insulating layer and the segment layer form a capacitor connecting the commutator segments to ground.

Preferably, the insulating layer has a thickness between the conductive layer and the segment layer in the range of 0.8 mm to 2.0 mm, and most preferably, the thickness is 1.0 mm.

Preferably, a concave-convex engagement structure is formed at contact surfaces between the conductive layer and the insulating layer, and/or, between the insulating layer and the segment layer to increase the surface area of the respective contact surfaces.

Preferably, the conductive layer is electrically grounded.

Preferably, the commutator is a face plate commutator and the conductive layer and segment layer are essentially planar.

Preferably, the commutator is a cylindrical commutator and the conductive layer forms an inner ring radially surrounded by the insulating layer.

According to another aspect, the present invention provides a rotor comprising a motor shaft and a commutator as described above, fixed to the motor shaft, wherein the motor shaft passes through a mounting hole formed in the commutator.

Preferably, the motor shaft is made of a conductive material, and the conductive layer is indirectly electrically grounded through the motor shaft.

Alternatively, the motor shaft is made of an insulating material and the motor shaft defines a through hole, a conductor extends from the conductive layer, passes through the through hole in the motor shaft and is then electrically grounded.

According to a further aspect, the present invention provides a motor comprising: a stator, and a rotor as described above.

Preferably, the stator includes a housing and the conductive layer of the commutator is grounded through the housing.

By adopting this solution of the present invention, the three-layer structure of the commutator forms a capacitor having an increased confronting area and reduced inter-plate distance. The capacitor thus has a greater capacitance and hence greater EMI-absorbing capability, which makes it possible to absorb EMI without additional EMI-absorbing components outside the commutator. EMI can be suppressed by directly grounding the conductive layer, by electrically grounding the motor shaft, or indirectly grounding the conductive layer through the motor shaft and the housing. EMI suppression can be successfully achieved using the remaining original parts and structure without any modification or with only a minor modification to the structure of the motor. As such, the extra EMI-absorbing structure and/or components added in the conventional motor are no longer necessary. Removing the original EMI-absorbing structure can reduce the weight of the motor as well as simplify the structure and fabrication process of the motor. It is to be understood that, in order to achieve more thorough EMI-suppression, the entire or part of the extra EMI-absorbing structure/components that are conventionally added may also remain in the motor adopting the structure of the present invention.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
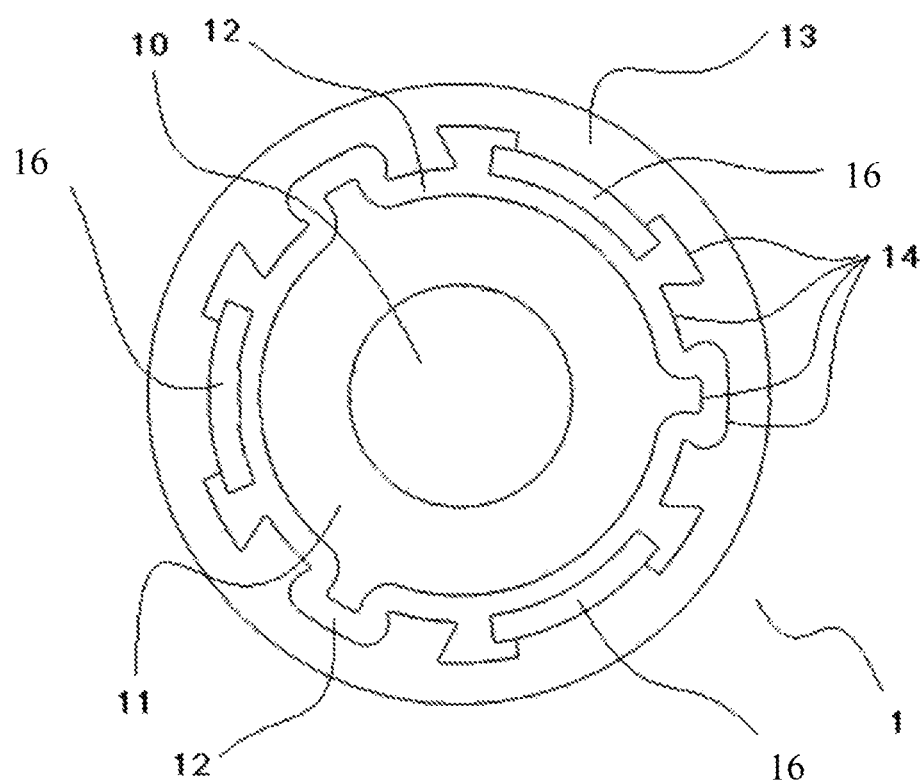
FIG. 1 is an end view of a commutator according to one embodiment of the present invention.

FIG. 1 is an end view of a commutator 1 in accordance with a first embodiment of the present invention. The commutator is of the cylindrical type and has a conductive layer 11 in the form of an inner ring, an insulating layer 12 radially surrounding the conductive layer 11, and a segment layer 13 radially surrounding the insulating layer 12. A mounting hole 10, used to mount the commutator on a motor shaft, is formed along an axis of the commutator. The conductive layer 11 and the segment layer 13 are isolated from each other by the insulating layer 12. The segment layer 13 includes multiple commutator segments 16. The segment layer 13 may be made of copper, the insulating layer 12 may be made of a resin material, and the conductive layer 11 may be made of copper, aluminum or another electrically conductive material. The conductive layer 11 and the segment layer 13 are electrically isolated by the insulating layer 12, thus forming a capacitor, with the conductive layer and the segment layer forming the pole plates of the capacitor. In addition to being directly proportional to the dielectric constant of the insulating material, the capacitance of the capacitor is also directly proportional to the confronting surface areas of the conductive layer 11 and the segment layer 13, on opposite sides of the insulating layer 12, and inversely proportional to an inter-plate distance between the conductive layer 11 and the segment layer 13. The addition of the conductive layer 11 not only increases the confronting surface area of the conductors on opposite sides of the insulating layer 12, but it also decreases the inter-plate distance between the conductors, thereby providing a capacitor with a greater capacitance.

Figure 2:
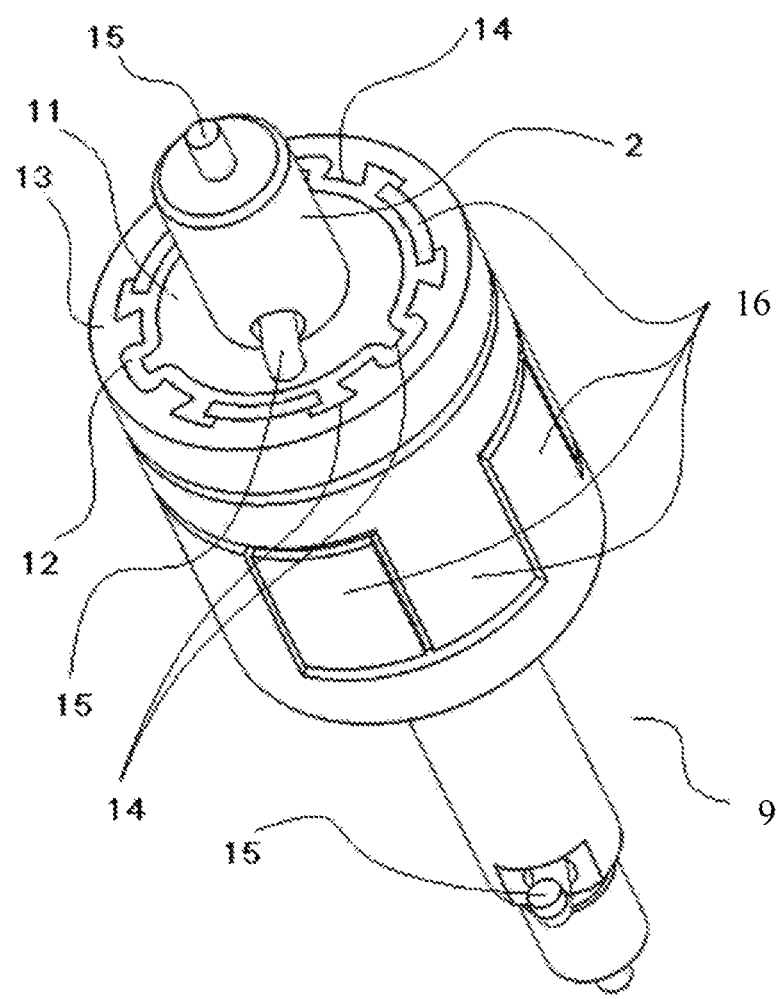
FIG. 2 is a perspective view of a rotor according to one embodiment of the present invention.
Figure 4:
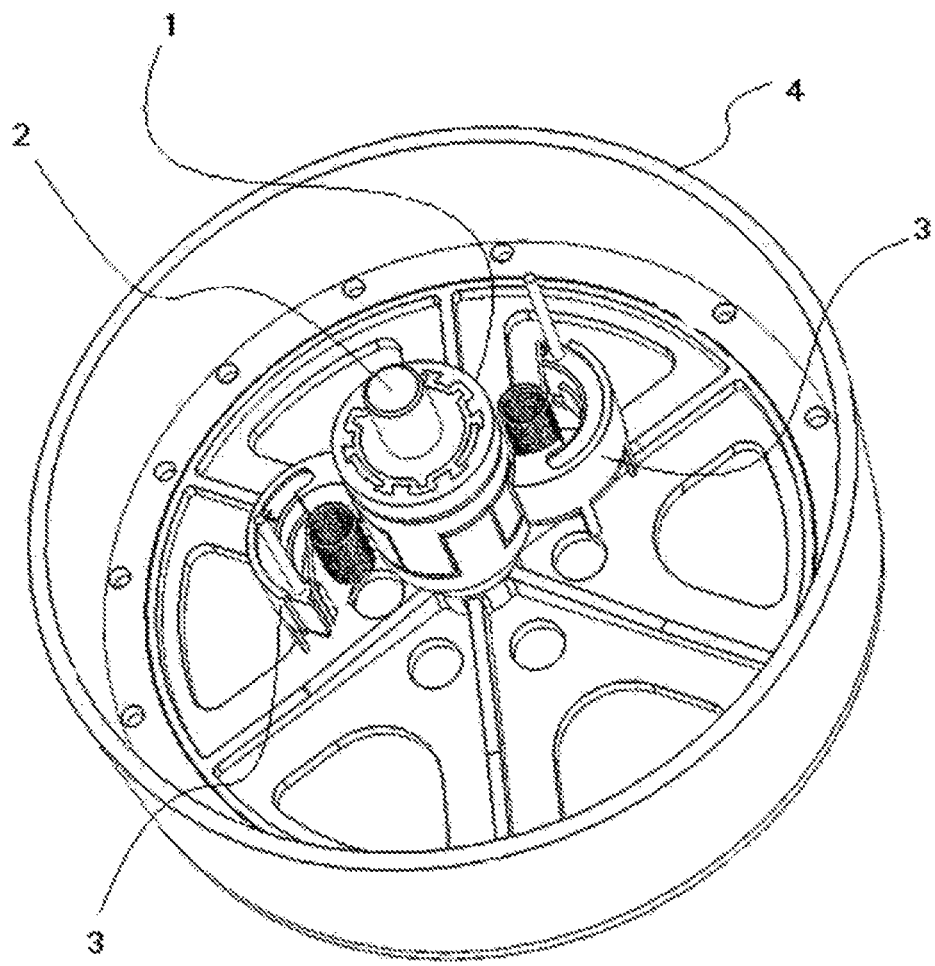
FIG. 4 is a perspective view of part of the rotor of the motor of FIG. 3.

After the commutator 1 of the present embodiment is mounted on the motor shaft 2 as shown in FIG. 2 and FIG. 4, the conductive layer 11 or segment layer 13 of the commutator 1 is directly or indirectly grounded. EMI generated during operation of the motor is absorbed by the capacitor with greater capacitance and released through the ground connection. As a result, the adverse effect caused by the EMI is significantly reduced or eliminated.

Theoretically, from the capacitor perspective, the insulating layer 12 has a uniform radial thickness (i.e. thickness of the layer) and a uniform radial distance between an inner surface of the insulating layer 12 and the axis, thus forming the same capacitance over the entire insulating layer 12 to ensure the same capability of absorbing EMI. However, considering the process complexity and the need of assembly and fixing of the insulating layer 12 to the conductive layer 11 and the segment layer 13, respectively, the layer thickness of the insulating layer 12 may not be uniform over the entire insulating layer 12.

Preferably, the thickness of the insulating layer 12 is in the range from 0.8 mm to 2 mm. If the thickness is too large, the conductive layer 11 and the segment layer 13 form a capacitance that is too small to absorb the EMI. If the thickness is too small, the thickness can not be guaranteed by the current fabrication processes. More preferably, the thickness is 1 mm, in which case, a large capacitance (the capacitance was found to be as large as 5 pf to 40 nf by testing a commutator of the same model) between the plates can be achieved without imposing a too-high requirement on the fabrication process.

As shown in FIG. 1 and FIG. 2, the conductive layer 11 and the insulating layer 12, and the insulating layer 12 and the segment layer 13 can be fastened in various manners including, for example, press-fit, adhesive bonding or snap-fit. In the present embodiment, concave-convex engagement structures 14 are formed on each of the contacting surfaces between the conductive layer 11 and the insulating layer 12, and the contacting surfaces between the insulating layer 12 and the segment layer 13. The purpose of the concave-convex engagement structures is to enhance the connection tightness between the connected two layers by increasing the binding force or frictional force between the contacting surfaces of the connected two layers. In an alternative embodiment, one or both of the two pairs of contacting surfaces may be connected in another manner. The concave-convex engagement structures also increases the contact surface areas between the layers.

Referring to FIG. 2, a rotor 9 in accordance with one embodiment of the present invention includes a motor shaft 2 and the commutator 1 of the above embodiment. The commutator 1 is mounted on the motor shaft 2 which passes through the motor shaft mounting hole 10. The motor shaft 2 and commutator 1 may be fastened together by various methods. In the present embodiment, the motor shaft 2 is preferably an interference-fit on the motor shaft mounting hole 10 to make sure that the commutator 1 rotates with the motor shaft 2. In addition, the interference fit connection manner avoids a gap between the motor shaft 2 and the mounting hole 10 which would cause wobbling of the commutator 1 on the motor shaft 2.

In this embodiment, the segment layer 13 or conductive layer 11 can be directly grounded to eliminate EMI. For example, as shown in FIG. 2, if the motor shaft 2 is non-conductive, a through hole 20 may be defined in the motor shaft 2. One end of a conductor 15 passes through the through hole 20 and is electrically connected with the conductive layer 11 of the commutator 1, and the other end is electrically grounded. As such, the commutator 1 can be electrically grounded without affecting the fabrication and operation of other motor parts by taking advantage of the rod like structure of the motor shaft 2.

If the motor shaft 2 is made of a conductive material and the conductive layer 11 is in electrical contact with the motor shaft 2, then the conductive layer may be grounded by grounding the motor shaft 2. As such, the conductive layer 11 can be indirectly electrically grounded through the motor shaft 2. Therefore, electrical grounding of the conductive layer 11 of the commutator 1 can be realized without modifying the structure of the motor shaft 2.

Figure 11:
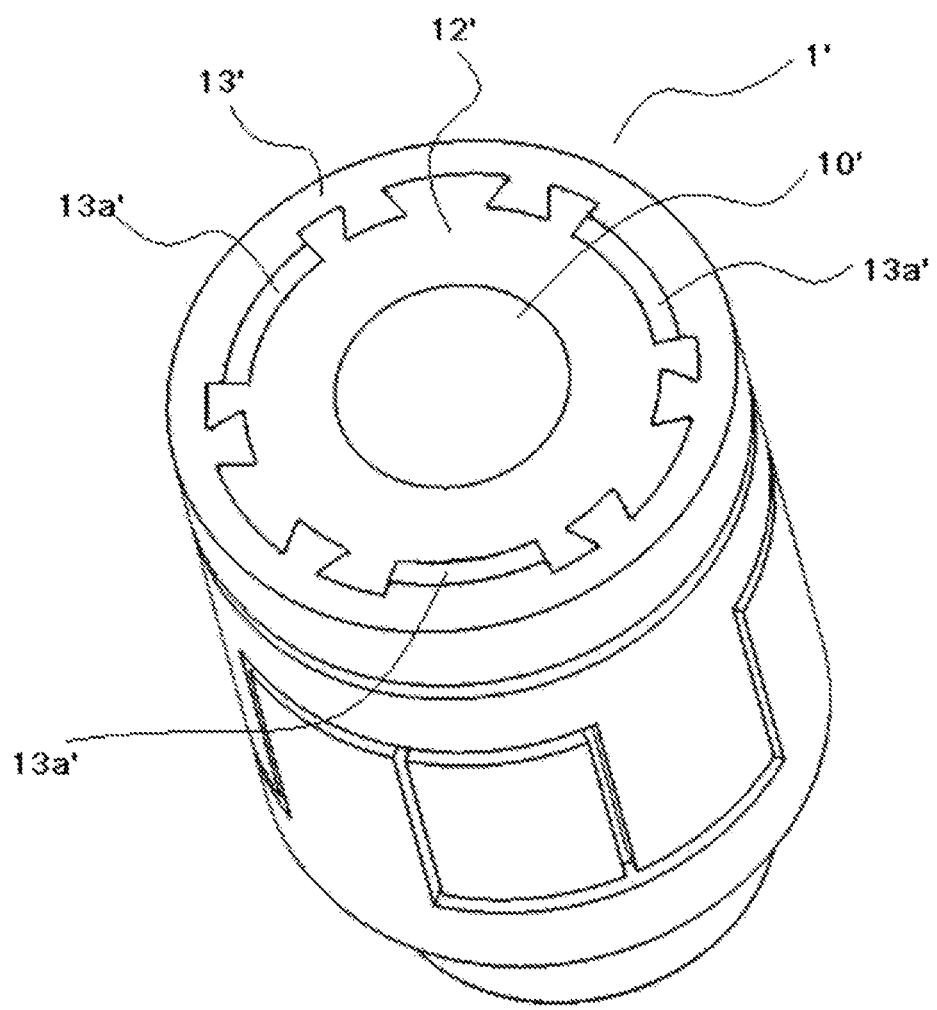
FIG. 11 is a perspective view of a known commutator.

When the motor shaft 2 is made of a conductive material, and is fitted with a conventional commutator 1' (FIG. 11) having an insulating layer 12' and a segment layer 13' but having no conductive layer, the insulating layer 12', the conductive segment layer 13' and the conductive motor shaft 2 also form a capacitor. However, because the motor shaft 2 has a relatively small diameter, it has a small surface area confronting the commutator layer 13' and the commutator segments 13a', and the motor shaft 2 and the segment layer 13' have a large distance there between (i.e. the radial thickness of the insulating layer 12'), the capacitor has a small capacitance. By testing a commutator of similar size, it was found that the capacitor is less than 1 pf when the thickness of the insulating layer is 4.5 mm. The EMI signal generated by the commutator 1' and carbon brush 3 has a low frequency, usually lower than 6 GHz, which can hardly be absorbed by the capacitor having such small capacitance. Therefore, no one skilled in the art has recognized that the EMI signal can be absorbed and discharged by a capacitor formed by the commutator alone or in combination with the motor shaft.

Figure 3:
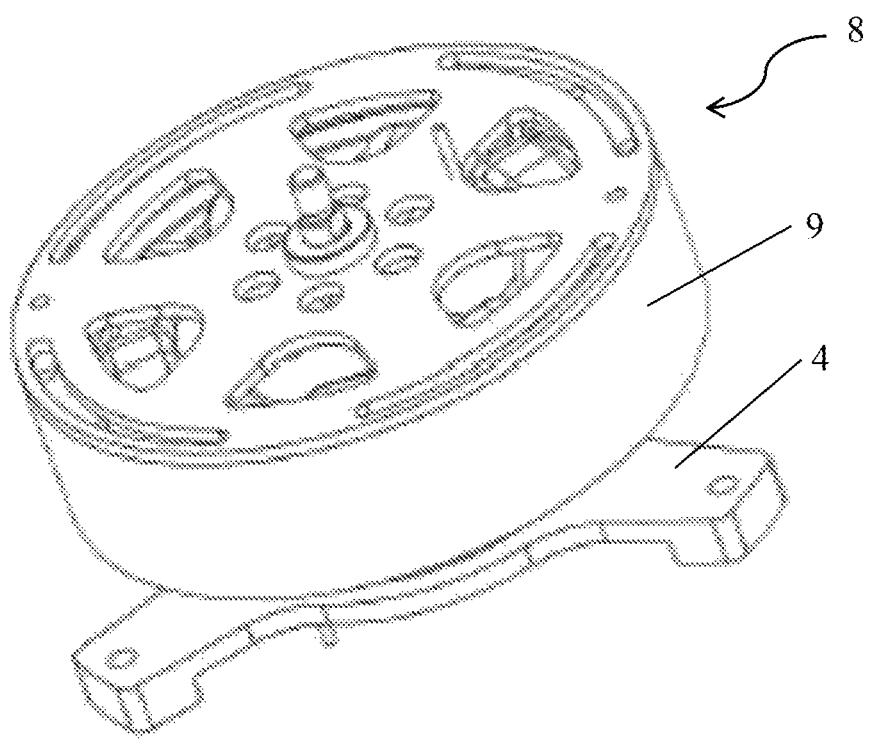
FIG. 3 is a perspective view of a motor according to one embodiment of the present invention.

FIG. 3 illustrates a first embodiment of a motor 8 of the present invention. The motor illustrated is an outer rotor motor and has a stator including a housing 4 and a rotor 9. The housing 4 supports the rotor through one or more bearings and also supports the stator core, stator windings, brushes, etc. The rotor is further illustrated in FIG. 4. The rotor includes a motor shaft 2, supporting the commutator 1 and a rotor core 7. Magnets, not shown, are fitted to an inner surface of the rotor core. Two brushes 3 and brush springs, being parts of the stator, are schematically illustrated for reference only. The commutator 1 of this embodiment is a special commutator having commutator segments and slip rings.

In this embodiment, the segment layer 13 or conductive layer 11 may be directly electrically grounded to eliminate EMI. When the housing 4 is made of a conductive material, the segment layer 13 or conductive layer 11 can further be electrically connected with the housing 4, and the housing 4 is electrically grounded. As such, the segment layer 13 or conductive layer 11 can be indirectly electrically grounded through the housing 4, and thus the EMI can be discharged via the housing.

The segment layer 13 or conductive layer 11 may be directly electrically grounded to eliminate EMI. For example, when the motor shaft 2 and the rotor core 7 are made of an insulating material, a through hole 20 may be defined through the motor shaft 2, one end of a conductor 15 passes through the through hole 20 to be electrically connected with the conductive layer 11 of the commutator 1, and the other end is electrically grounded.

Similarly, when the rotor core 7 is made of a conductive material and the motor shaft 2 is made of an insulating material, one end of the conductor 15 passes through the through hole 20 to be electrically connected with the conductive layer 11 of the commutator 1, and the other end is electrically connected with the rotor core 7. As such, the commutator 1 can be electrically grounded without affecting the fabrication and operation of other motor parts by taking advantage of the rod like structure of the motor shaft 2. When both the housing 4 and motor shaft 2 are made of a conductive material, as shown in FIG. 4, the motor shaft 2 is electrically connected with the conductive layer 11 and the housing 4, allowing the conductive layer to be grounded through the housing. Thus, the EMI absorbed by the capacitor can be successfully discharged by using the current conductive motor shaft 2 and housing 4 without making any structural modification to the motor.

Figure 5:
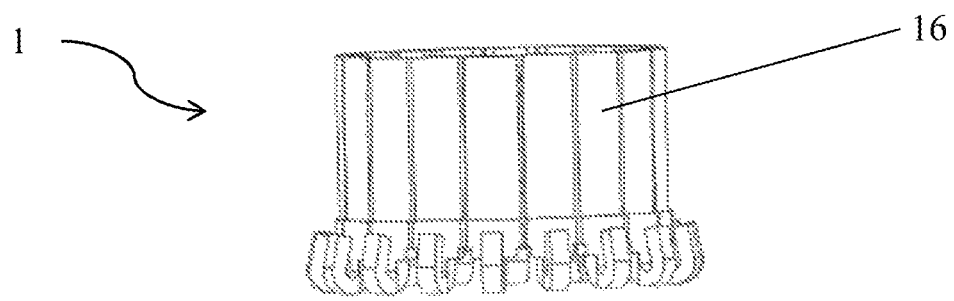
FIG. 5 illustrates a cylindrical commutator according to the present invention.
Figure 6:
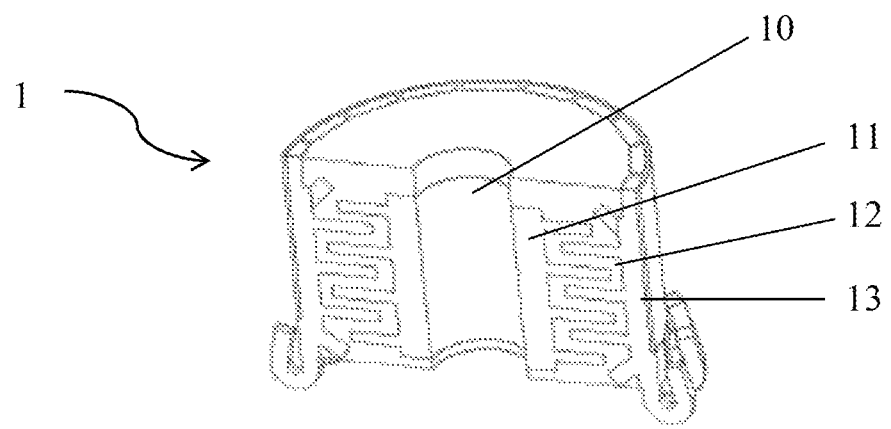
FIG. 6 is a sectional view of the commutator of FIG. 5.

The invention is applicable to other types of commutators. FIGS. 5 & 6 illustrated a standard cylindrical type commutator and FIGS. 7 to 10 illustrate two standard planar type commutators, modified according to the present invention. The cylindrical commutator of FIG. 5 has a plurality of commutator segments 16 arranged about an outer surface of a commutator body, in a manner producing a cylindrical brush contact surface. The commutator body comprises the conductive layer 11 in the form of an inner ring and the insulating layer 12 formed radially about the inner ring. The inner ring has a number of radially extending discs extending towards the segment layer and interleaved with radially extending fingers formed on the commutator segments and forming discontinuous discs extending radially towards the inner ring. The interleaved discs significantly increases the contact surface areas with the insulating layer and allows the thickness of the insulating layer between the segment layer and the conductive layer to be controlled to a small dimension.

Figure 7:
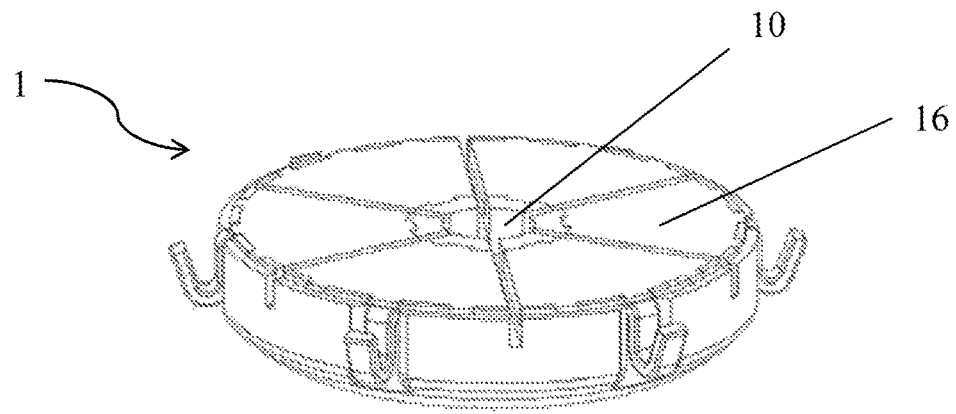
FIG. 7 illustrates a planar commutator according to the present invention.
Figure 8:
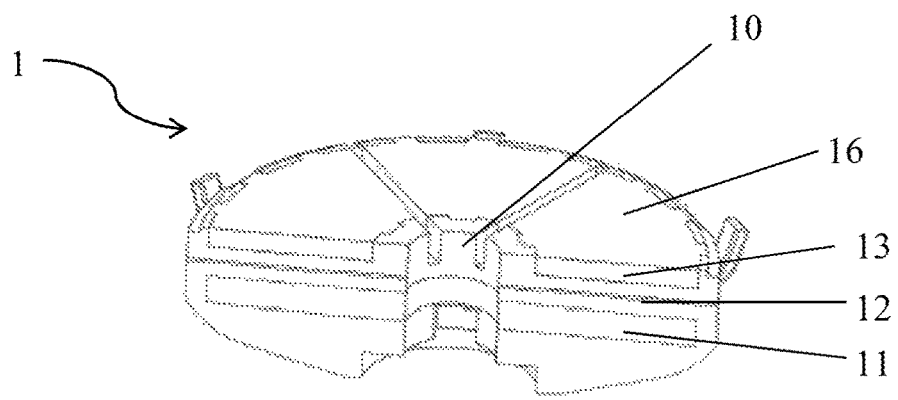
FIG. 8 is a sectional view of the commutator of FIG. 7.

FIG. 7 illustrates a thin planar commutator 1. The segment layer 13 formed of a plurality of commutator segments 16 forms a planar brush contact surface. As shown in the sectional view of FIG. 8, the conductive layer is flat disc separated from the segment layer 13 by the insulating layer 12. In this embodiment the insulating layer 12 forms the body of the commutator and is directly molded to the segment layer and the conductive layer to fix these two layers in spaced relationship. The segment layer is a single piece disc when the insulating layer is over molded and then cut into individual commutator segments thereafter. The conductive layer is exposed in the shaft mounting hole 10 to make direct electrical connection with the motor shaft, should the motor shaft be electrically conductive.

Figure 9:
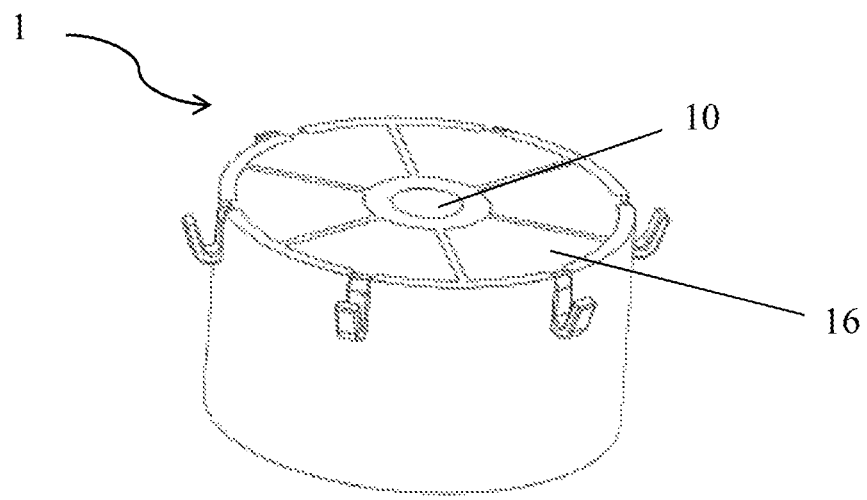
FIG. 9 shows another planar commutator according to the present invention.
Figure 10:
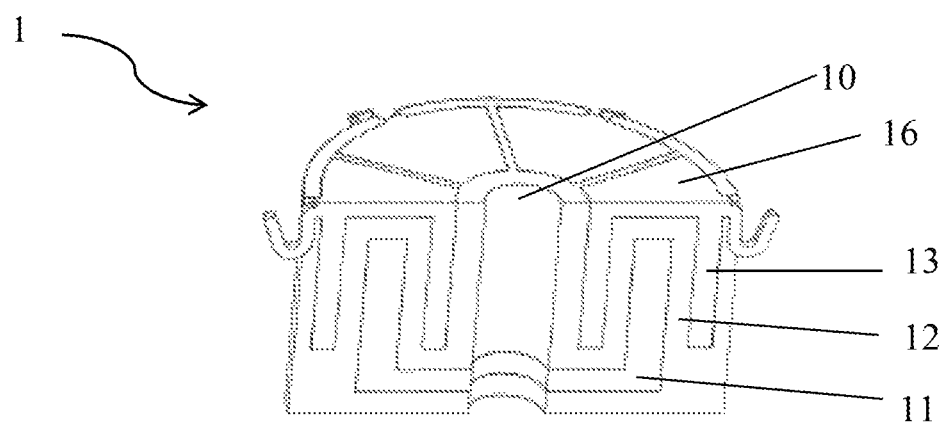
FIG. 10 is a sectional view of the commutator of FIG. 9.

FIG. 9 illustrates a thick planar commutator 1. As shown in the cross sectional view of FIG. 10, the conductive layer 11 is cup shaped with the base of the cup extending radially and the shaft mounting hole 10 passing through the base. Again the conductive layer 11 may be exposed in the shaft mounting hole for electrical connection with the shaft. The commutator segments of the segment layer 13 form two discontinuous rings which confront the sides of the cylindrical portion of the cup. The insulating layer is disposed between the conductive layer and the segment layer to hold these parts and to form the dielectric of the capacitor while the confronting portions of the segment layer and the conductive layer 11 form the poles of the capacitor. This increases the surface area of the poles and thus the capacitance of the capacitor.

The phrase "directly grounded" used herein means that it is electrically grounded without using any conductive structure of or associated with the motor. The phrase "indirectly grounded" used herein means that it is electrically grounded through any conductive structure of or associated with the motor. Because the segment layer 13 mainly comprises multiple separate commutator segments 16, grounding of the segment layer 13 has great difficulty and complexity. Therefore, preferably, it is the conductive layer 11 that is directly or indirectly grounded.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A commutator comprising: a conductive layer,
a segment layer including a plurality of commutator segments, and
an insulating layer fixed between the conductive layer and the segment layer, the insulating layer electrically isolating the segment layer from the conductive layer,
wherein the conductive layer, the insulating layer and the segment layer form a capacitor connecting the commutator segments to ground.

2. The commutator of claim 1, wherein the insulating layer has a thickness between the conductive layer and the segment layer in the range of 0.8 mm to 2.0 mm.

3. The commutator of claim 2, wherein the thickness of the insulating layer is 1.0 mm.

4. The commutator of claim 1, wherein a concave-convex engagement structure is formed at contact surfaces between the conductive layer and the insulating layer, and/or, between the insulating layer and the segment layer to increase the surface area of the respective contact surfaces.

5. The commutator of claim 1, wherein the conductive layer is electrically grounded.

6. The commutator of claim 1, wherein the commutator is a face plate commutator and the conductive layer and segment layer are essentially planar.

7. The commutator of claim 1, wherein the commutator is a cylindrical commutator and the conductive layer forms an inner ring radially surrounded by the insulating layer.

8. A rotor comprising a motor shaft and the commutator of claim 1 fixed to the motor shaft, wherein the motor shaft passes through a mounting hole formed in the commutator.

9. The rotor of claim 8, wherein the motor shaft is made of a conductive material, and the conductive layer is indirectly electrically grounded through the motor shaft.

10. The rotor of claim 8, wherein the motor shaft is made of an insulating material and the motor shaft defines a through hole, a conductor extends from the conductive layer, passes through the through hole in the motor shaft and is then electrically grounded.

11. A motor comprising: a stator, and the rotor of claim 8.

12. The motor of claim 11, wherein the stator includes a housing and the conductive layer of the commutator is grounded through the housing.

* * * * *